(No Model.)

E. A. SMITH.
SMOKING TUBE.

No. 247,425. Patented Sept. 20, 1881.

WITNESSES:
A. Schehl.
C. Sedgwick

INVENTOR:
E. A. Smith
BY Munn & Co
ATTORNEYS.

UNITED STATES PATENT OFFICE.

EDWARD A. SMITH, OF ST. ALBANS, VERMONT.

SMOKING-TUBE.

SPECIFICATION forming part of Letters Patent No. 247,425, dated September 20, 1881.

Application filed February 11, 1881. (No model.)

*To all whom it may concern:*

Be it known that I, EDWARD A. SMITH, of St. Albans, in the county of Franklin and State of Vermont, have invented a new and useful Improvement in Smoking-Tubes, of which the following is a specification.

The object of my invention is to provide a substitute for cigars and ordinary pipes having all the advantages of cigars in the respect of convenience, with the additional advantages of being more economical and less injurious to health.

My invention consists in a cigar-shaped smoking-tube having its aperture fitted with a spool of peculiar form, by which smoke-passages and a chamber are formed.

Figure 1:
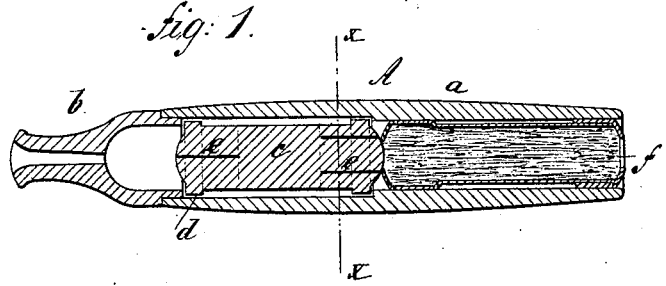
Figure 2:
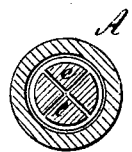
Figure 3:
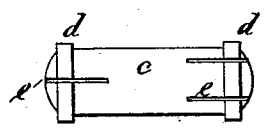
Figure 4:
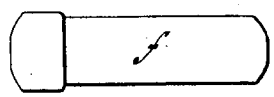

In the accompanying drawings, Figure 1 is a longitudinal section of my improved smoking-tube. Fig. 2 is a transverse section of the same on line $x\ x$ of Fig. 1. Fig. 3 is a side elevation of the spool detached, and Fig. 4 is a side elevation of the cartridge.

Similar letters of reference indicate corresponding parts.

A is the smoking-tube, consisting of the main portion $a$, mouth-piece $b$, and interior spool, $c$. The portion $a$ may be made wholly or partly of wood or other suitable material; the mouthpiece $b$ may be of wood, amber, or other material, and attached in any suitable manner, and the spool $c$ will be made of glass or other material that is a poor conductor of heat. The tube will have an outer shape similar to a cigar. The spool $c$ has its outer surface recessed between the ends, to form a projecting flange, $d$, at each end, which flanges fit tightly upon the inner surface of the tube. The forward flange abuts against a shoulder formed by an enlargement of the aperture of the tube, and the position of the spool is such that there is a chamber at its rear end. The tube $c$ is also formed with longitudinal slots $e$, extending from each end inward about one-third the length of the spool. These slots form passages that give communication from each end of the spool to the annular space between flanges $d$, so that the smoke may pass through and around the spool in thin streams.

The cartridge $f$, for loading the tube, is formed cylindrical, of a size for entering loosely and filling the space between spool $c$ and the end of the tube. The tobacco forming the cartridge is wrapped in asbestus-paper, with a strip, to give extra thickness, applied around the outer end, so that the cartridge will fit air-tight at that end. At the ends the covering will be perforated, as shown, and to insure perfect draft the end of spool $c$ will be rounded, so that the cartridge cannot close the slots $e$.

In the use of the tube the smoke passing through the spool and rear chamber in broad and thin streams becomes cooled and deposits the oily matter it contains before passing the mouth-piece. The smoke thus goes to the smoker's mouth free from all deleterious matter, in a cool stream of large size, instead of in one or more fine and heated streams. Only the tobacco is burned, as the asbestus-paper will remain unconsumed in the form of a shell, containing all of the waste matters, so that when the shell is drawn out the tube is left clean.

To clean the chamber in the tube and the spool the mouth-piece is to be first removed and the spool then drawn out, thus leaving every part fully exposed.

This smoking-tube is cleanly, safe, and convenient, and serves to remove the deleterious portions from the smoke. Having the appearance and form of a cigar, it is especially adapted for street use, and also used with safety under conditions where the fire of pipes or cigars would be dangerous.

Having thus fully described my invention, I claim as new and desire to secure by Letters Patent—

The combination, with a smoking-tube, of spool $c$, having flanges $d$ and slots $e$, placed to form a chamber next to the mouth-piece, substantially as shown and described.

EDWARD A. SMITH.

Witnesses:
HENRY M. FARNAM,
GUY C. NOBLE.